;# (12) United States Patent
Ma et al.

(10) Patent No.: US 8,990,186 B2
(45) Date of Patent: Mar. 24, 2015

(54) TECHNIQUES FOR UPDATING JOIN INDEXES

(75) Inventors: Xiaobin Ma, Nashua, NH (US); Grace Kwan-On Au, Rancho Palos Verdes, CA (US); Lu Ma, Tenafly, NJ (US)

(73) Assignee: Teradata US, Inc., Dayton, OH (US)

(*) Notice: Subject to any disclaimer, the term of this patent is extended or adjusted under 35 U.S.C. 154(b) by 465 days.

(21) Appl. No.: 13/339,023

(22) Filed: Dec. 28, 2011

(65) Prior Publication Data

US 2013/0173588 A1 Jul. 4, 2013

(51) Int. Cl.
*G06F 7/00* (2006.01)
*G06F 17/30* (2006.01)

(52) U.S. Cl.
CPC .................................. *G06F 17/30* (2013.01)
USPC .......................................................... 707/714

(58) Field of Classification Search
CPC .................... G06F 17/30286; G06F 17/30289; G06F 17/30312; G06F 17/30321; G06F 17/30466; G06F 17/30498
USPC .......................................................... 707/714
See application file for complete search history.

(56) References Cited

U.S. PATENT DOCUMENTS

| 6,167,399 | A | 12/2000 | Hoang |
| 6,505,188 | B1 | 1/2003 | Ghazal et al. |
| 6,505,189 | B1 | 1/2003 | Au et al. |
| 6,615,206 | B1 | 9/2003 | Jakobsson et al. |
| 6,643,636 | B1 | 11/2003 | Au et al. |
| 6,745,198 | B1 | 6/2004 | Luo et al. |
| 7,467,128 | B2 * | 12/2008 | Larson et al. ........................ 1/1 |
| 7,912,833 | B2 | 3/2011 | Gui et al. |
| 8,032,503 | B2 * | 10/2011 | Bouloy et al. ................. 707/696 |
| 2005/0187917 | A1 * | 8/2005 | Lawande et al. .................. 707/3 |
| 2008/0033907 | A1 * | 2/2008 | Woehler et al. ................... 707/2 |

* cited by examiner

*Primary Examiner* — Jeffrey A Burke
(74) *Attorney, Agent, or Firm* — Schwegman, Lundberg & Woessner, P.A.

(57) ABSTRACT

Techniques for updating join indexes are provided. A determination is made to update date criteria in a join index query statement. The join index is parsed for current date and current time criteria. The join index is revised based on the location of the current date and current time criteria as they appear in the original join index. The revisions include new criteria that minimize the effort in maintaining and using the join index.

20 Claims, 4 Drawing Sheets

TECHNIQUES FOR UPDATING JOIN INDEXES

BACKGROUND

A join index (JI) is a cross between a database view and an index. It is like a database view because it is defined via a database query. It is like an index because of the way the underlying database system processes it, such as when underlying tables associated with the JI change the JI is automatically updated so that each time a JI is processed, the data returned is up-to-date.

A JI or materialized view is widely used in database systems to improve query performance. A sparse JI on which a WHERE clause is defined is particularly useful for users to create a window into a large table for the data of interest. For example, in an Active Data Warehouse environment, while the transaction table contains records of all transactions that have ever taken place, certain applications may only need to look at transactions that have taken place in the past 3 days. For such applications, users may choose to create a sparse JI with a date range of "BETWEEN CURRENT_DATE—interval '3' days AND CURRENT_DATE—interval '1' day." The need for users to define a sparse JI based on the system-defined constants, CURRENT_DATE (CD) and/or CURRENT_TIMESTAMP (CT), increases with the advent of temporal databases. One problem with sparse JI based on CD or CT is that data in the sparse JI becomes out-of-date over time. It may contain historical data that is no longer of interest to the users or it may not have the more recent data that is of interest to the users. The former may result in a large JI structure that degrades the performance of JI. The later may render the JI to be unusable as it doesn't have the recent data to cover user queries.

Some database features provided an ALTER <JI> TO CURRENT statement that allows users the ability to refresh the content of a JI by moving CD and/or CT in a JI definition to the current date and/or time. A straightforward approach of handling this kind of ALTER statement is to drop the JI and recreate it with the current value of CD and/or CT. However, this is not an efficient approach since dropping and re-creating a JI involves a lot of data dictionary operations and materializing a new JI can be very time-consuming.

Therefore, it is desirable to devise an algorithm to incrementally maintain existing JI without dropping and recreating it just for refreshing the CD and/or CT. As is known, CD and/or CT can appear in almost anywhere in a JI. More specifically, CD and/or CT can appear in the following Structure Query Language (SQL) constructs:

SELECT List;
WHERE clause;
ON clause;
GROUP BY clause;
ORDER BY clause;
PRIMARY INDEX clause; and
PARTITION BY clause.

How the content of a JI is affected by an ALTER statement depends on the clause(s) that CD and/or CT are used in. The incremental maintenance algorithms for ALTER statements should be tuned to catch these differences in order to minimize the JI maintenance costs.

SUMMARY

In various embodiments, techniques for updating join indexes are presented. According to an embodiment, a method for updating a join index (JI) is provided.

Specifically, a query that defines a JI is acquired. Next, the query is parsed to identify each occurrence and each context where a CD or CT condition is used within that query. A determination is made as to which actions to take based on each occurrence and each context. Finally, the query and the JI are updated by using the actions to restate the query.

DETAILED DESCRIPTION

Figure 1A:
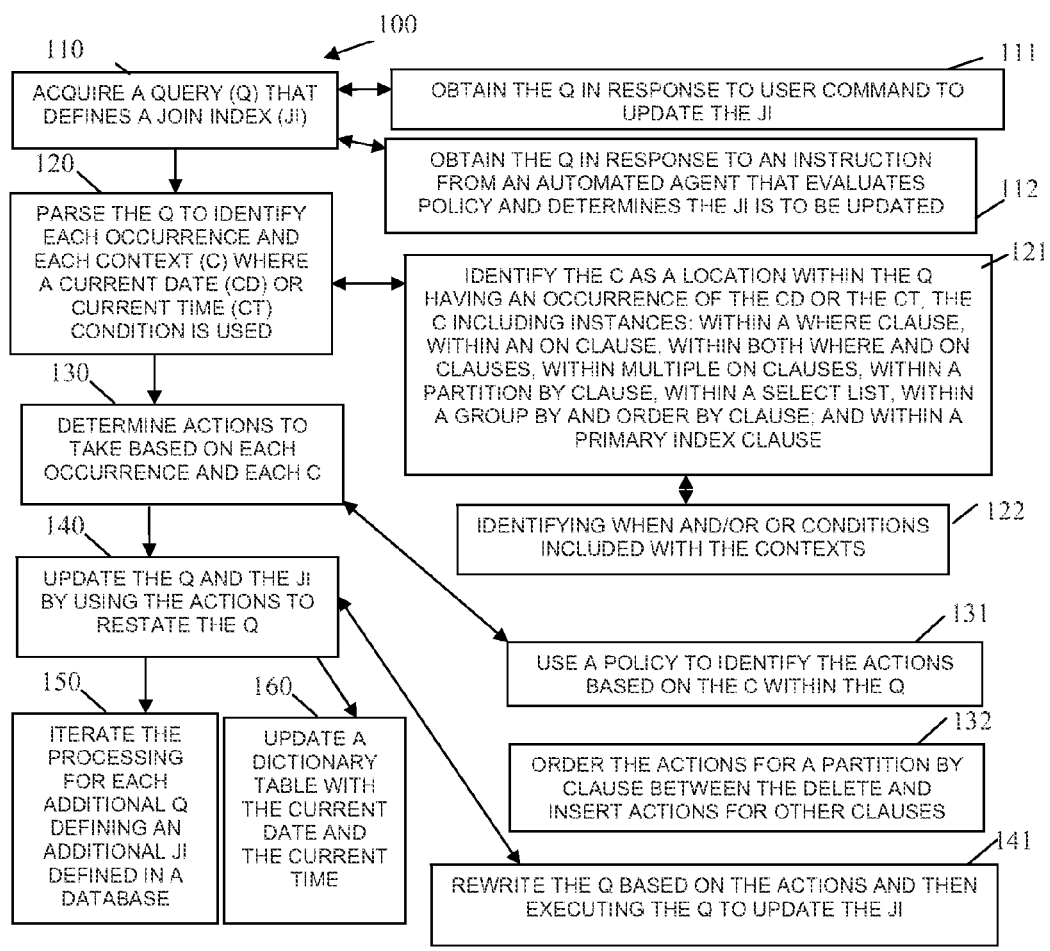
FIG. 1A is a diagram of a method for updating a JI, according to an example embodiment.

FIG. 1A is a diagram of a method 100 for updating a JI, according to an example embodiment. The method 100 (hereinafter "JI updater") is implemented as instructions within a non-transitory computer-readable storage medium that execute on a plurality of processors, the processors specifically configured to execute the JI updater. Moreover, the JI updater is programmed within a non-transitory computer-readable storage medium. The JI updater may also be operational over a network; the network is wired, wireless, or a combination of wired and wireless.

Before discussing the processing associated with the JI updater some details regarding embodiments of the invention and context are presented.

MoveDate (operation to move and thus update dates in a JI) in JI processing provides for a moving a CD/CT facility for a JI so that the content of a JI can be refreshed periodically without having to drop and recreate the JI. The techniques herein analyze all the appearances of CD and/or CT, generates minimum DELETE, INSERT and/or UPDATE set of data operations, and figures out (and devises if needed) proper JI maintenance mechanisms for different maintenance conditions that can arise. An incremental maintenance technique for an ALTER operation includes of up to three parts, deleting the rows that are no longer needed, inserting new rows, and/or updating existing rows in a JI.

The novel techniques for handling the CD and CT in SQL statements that define join indexes are now discussed in turn.
Handling CD/CT Condition in WHERE Clause An Incremental JI Maintenance approach is applied here to create the conditions for qualifying those base table rows that no longer satisfy the new resolved CD/CT value and the conditions for qualifying those new base table rows that satisfy the new resolved CD/CT value. Let's call the former the "del_cond" and the later the "ins_coed." The formulae for creating these conditions are as follows:

del_cond=(old_date_condition) AND !(new_date_condition); and
ins_cond=!(old_date_condition) AND (new_date_condition).

Where old_date_condition is the condition resulting from substituting the CD/CT in the JI CD/CT condition with a ResolvedCurrent_Date/ResolvedCurrent_Timestamp stored in a dictionary Table-View-Macro (TVM) table while new_date_conditions is the condition resulted from substituting CD/CT with the current date/timestamp value. TVM may be referred to herein as a "dictionary table" that stores the definition of user-defined tables, join indexes, views, and macros. The resolved value of any CD/CT used in the definition of a JI is also stored in the TVM table.

A CD/CT condition is a single-table condition specified in the JI's WHERE clause or ON clause that references CD or CT. If there are other non-CD/CT conditions that are AND'ed with the CD/CT condition in the WHERE clause, they are not extracted into the JI CD/CT condition. If the non-CD/CT conditions are OR'ed with the CD/CT condition, the entire OR condition is extracted into the JI CD/CT condition.

EXAMPLES create join index ji_movedate1 as select * from t1 where end(d1)>=current_date AND b1>0; and
   create join index ji_movedate2 as select * from t1 where end(d1)>=current date OR b1>0.

Where (in the previous presented example), the JI CD/CT condition for ji_movedate1 is just the condition "end(d1)>=current_date" whereas the JI CD/CT condition for ji_movedate2 is the entire condition "end(d1)>=current_date OR b1>0".

Let's say both JI's were created on '2008-05-20' and we now want to update both JI's to the latest date '2008-05-22'. For ji_movedate1,
   del_cond=end(d1)>='2008-05-20' AND end(d1)<'2008-05-22'
   ins_cond=end(d1)<='2008-05-20' AND end(d1)>=2008-05-22'

Both conditions are run through a Satisfaction and Transitive Closure (SATTC) query for an unsatisfiability check. In this case, the ins_cond is returned as unsatisfiable, which means no new rows need to be inserted into the JI. For ji_movedate2,
   del=(end(d1)>='2008-05-20 OR b1>0) AND NOT (end (d1)>='2008-05-22 OR b1>0); and
   ins_cond=NOT (end(d1)>='2008-05-20' OR b1>0) AND (end(d1)>='2008-05-22 OR b1>0).

Again, the ins_cond is detected as unsatisfiable by the SATTC query. Running the del_cond through the SATTC query for simplification results in the following simplified del_cond:
   end(d1)<='2008-05-21' AND end(d1)>='2008-05-20' AND b1<=0

If the del_cond is not unsatisfiable, JI is invoked to perform delete maintenance. If the ins_cond is not unsatisfiable (capable of being satisfied), JI is invoked to perform insert maintenance.

Handling CD/CT Condition in ON Clause

A CD/CT condition on the inner-table of an outer join is a filtering condition on the inner-table. Therefore, it is handled the same way as a CD/CT condition in the WHERE clause. However, unlike a WHERE clause condition or an ON cause condition specified on the inner-table of an outer join, an ON clause condition on the outer table of an outer join (OuterTabCDCond) is a join condition, i.e., itself doesn't disqualify (filter out) outer table rows from participating in the join. It merely affects whether a joined row is a matching row or a non matching row. For example, consider the following JI:
   Create join index ji_oj as select * from t1 left join t2 ON
      a1=a2
   and end(t1.d1)>=CURRENT_DATE
   and end(t1.d1)<CURRENT_DATE+interval '1' year;

All t1 rows are in the result of the left join regardless of the value of CD. The value of CD only affects whether a joined row is a matching row or a non matching row.

Therefore, to handle the altering of the CD/CT value in an OuterTabCDCond, we first maintain the JI as if deleting all those outer table rows that are affected by the ALTER TO CURRENT, update the resolved CD/CT value in TVM table, and then maintain the JI as if the same set of rows is inserted back into the JI. This way, all the affected JI rows, matching and not matching, are deleted and then a new set of matching and not matching rows are put back into the JI based on the new OuterTabCDCond.

The conditions for identifying the affected rows is simply (del_cond OR ins_cond) where del_cond identifies those rows that don't qualify the new_date_condition while ins_cond identifies those new rows that qualify the new_date_condition. The del_cond and ins_cond are determined as described above with the "Handling CD/CT Condition in WHERE Clause."

Handling Complex CD/CT Conditions

The approach of deleting the set of affected rows, updating the resolved CD/CT value in TVM table and then inserting the same set of rows is a general technique that can handle all situations. Therefore, this technique is used for complicated cases such as the following scenarios:

i. A CD/CT condition on the same table is found in both WHERE clause and ON clause. For example,
   create join index ji_oj1 as select * from t1 left join t2 ON
      a1=a2 and e1<CURRENT_DATE WHERE end(d1)>=CURRENT_DATE;

ii. A CD/CT condition on the same table is found in multiple ON clauses. For example, create join index ji_oj2 as select * from t1 left join t2 ON a1=a2 and e1>=CURRENT_DATE left join t3 ON a1=a2 and end(d1)>=CURRENT_DATE;

Define the complex JI (ComplexJI) condition if the JI definition has multiple CD/CT conditions across multiple ON/WHERE clauses.

There are four different kinds of conditions in the ComplexJI case. There are: lower bound conditions, upper bound conditions, equal conditions, and not-equal conditions. Because the condition can be very, very complicated, it is very hard to know whether the condition is really an upper bound or a lower bound. A unified approach is used to generate delete and insert conditions. First negating lower bound conditions, upper bound conditions and not-equal conditions and keep equal conditions. Then, make a copy of these conditions and replace CD/CT in the these conditions and their copies with both new date/timestamp and old date/timestamp respectively. All these conditions are OR'ed together, simplified to generate final conditions and then sent to JI maintenance module for deletion, insertion and/or update.

Handling PARTITION BY Clause

Handling CD/CT in PARTITION BY clause of JI uses the same approach in Moving Current Date and Moving Current Timestamp for a PPI. The task here is to find CD/CT in PARTITION BY clause and apply the algorithm in above between DELETE and INSERT parts of the JI maintenance in order to minimize the maintenance costs.

Handling SELECT list

If CD/CT is a stand-alone field in SELECT list, there is no need to delete and/or insert any row. In this case, only previously resolved CD/CT has to be replaced by newly resolved CD/CT. Therefore, a JI UPDATE operation is enough.

For example, in the following case,
   Create join index ji1 as
   SELECT CURRENT_DATE, a1
   from t1;

However, when CD/CT together with a base table field is involved in a JI field, the whole content of a JI has to be deleted first and then new rows are generated to insert into the JI.

The other case is when there is an aggregate function defined on a column with CD/CT.

Handling GROUP BY and ORDER BY Clause

If there exist CD/CT GROUP BY or ORDER BY clause in a JI, the JI column with CD/CT may be referenced anywhere in the SELECT list. Since it is a rare case, the technique goes through DEL/INS ALL path that deletes all rows in the JI and generates all new rows to insert into the JI.

Handling PRIMARY INDEX clause

If a CD/CT are defined as (part of) a primary index, the whole JI needs to be redistributed. Therefore, the current approach is to delete all rows and re-generate all rows with newly resolved CD/CT.

As will be demonstrated more completely in the detail that follows, the techniques presented herein provide a variety of benefits. Specifically, the techniques herein generate conditions for MoveDate (move date operation) JI for different JI cases in order to create minimum set of rows for deletion, insertion and/or update on the JI. With these techniques, the need for dropping and recreating the whole JI is eliminated, data dictionary operations are reduced dramatically, and the JI maintenance costs are minimized by combining all conditions from multiple tables into single conditions and maintaining the JI in one shot. These techniques are also used for refreshing the SystemDefinedJI (a unique JI) to enforce the uniqueness of a column in a temporal table for certain timeframes, thereby maintaining the data integrity in a temporal table.

Figure 1B:
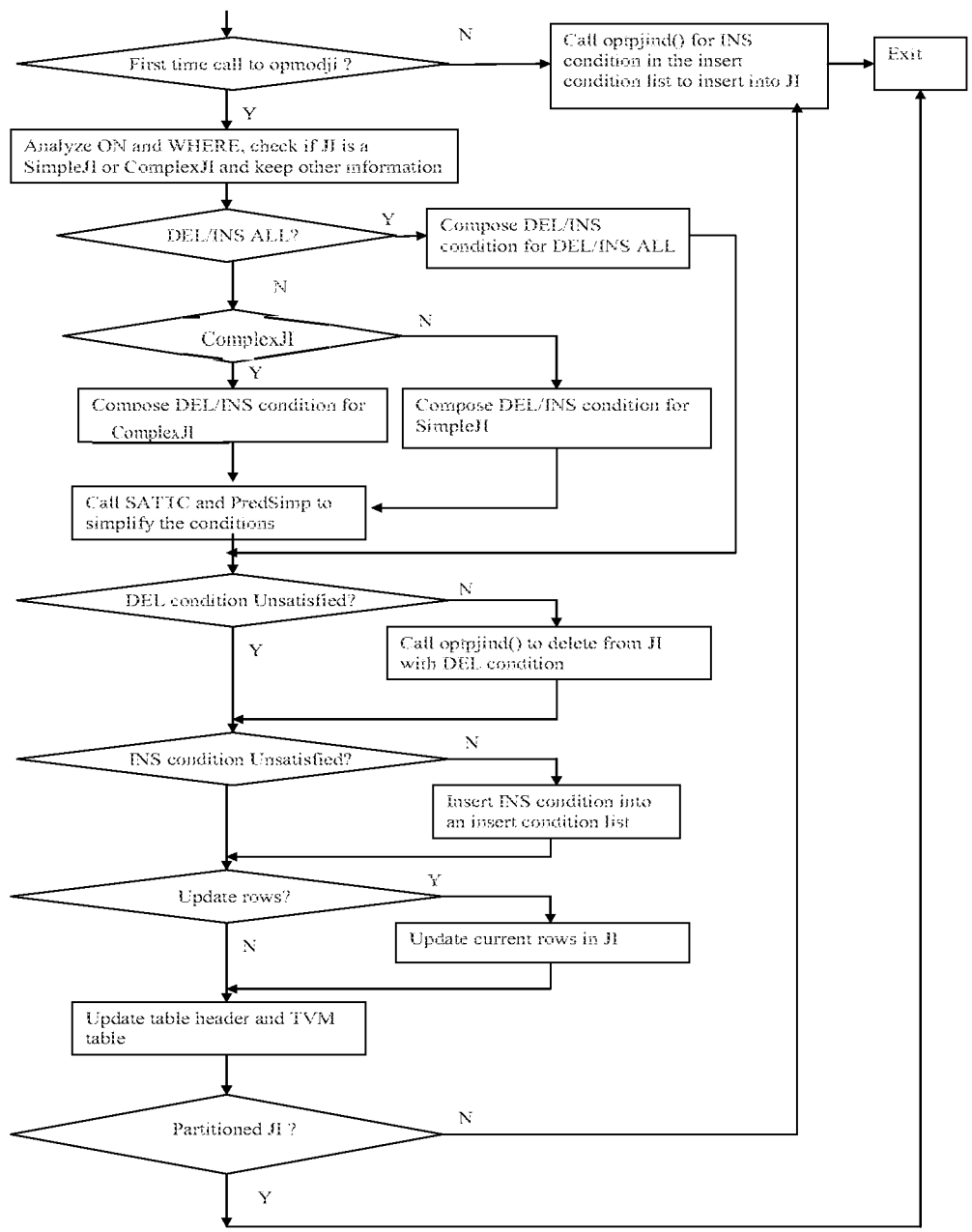
FIG. 1B is a flow diagram demonstrating the processing associated with a move date update operation for a JI, according to an example embodiment.

FIG. 1B provides a flow chart that illustrates the processing of move date operation (MoveDate) in a JI.

Figure 2:
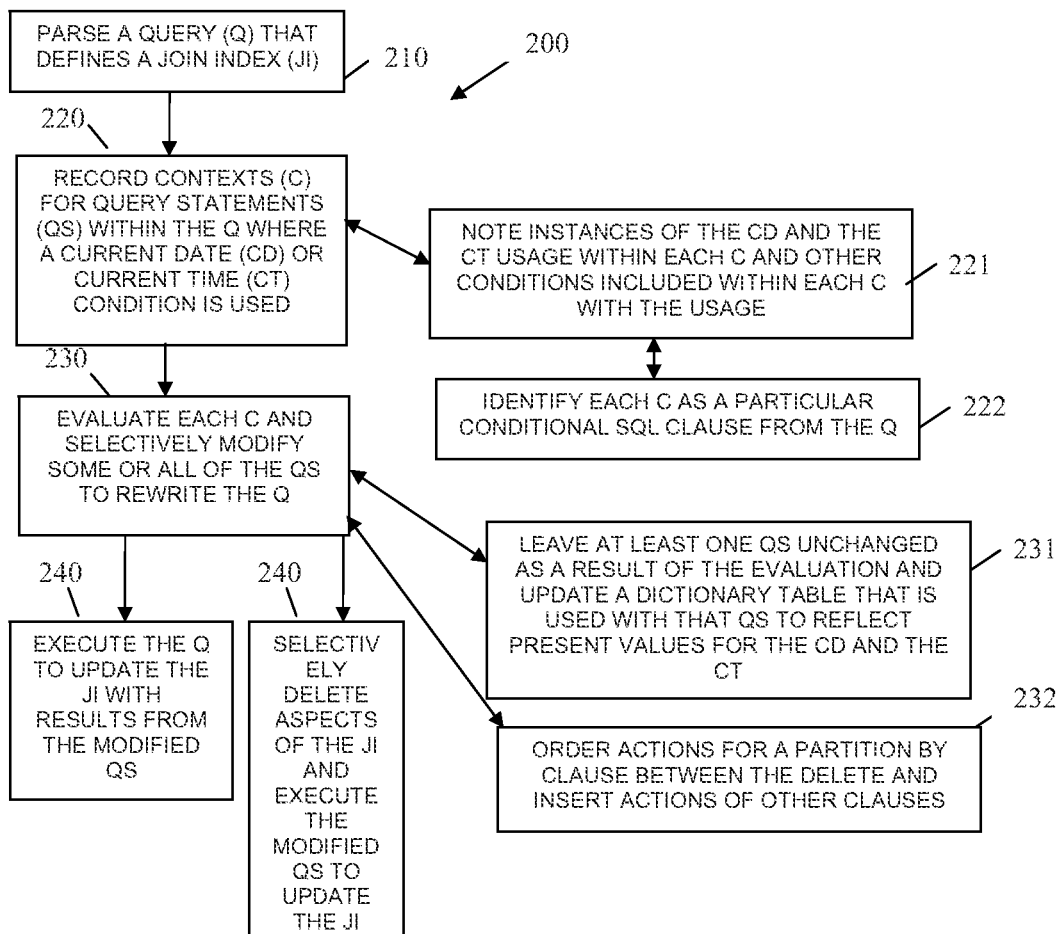
FIG. 2 is a diagram of another method for updating a JI, according to an example embodiment.
Figure 3:
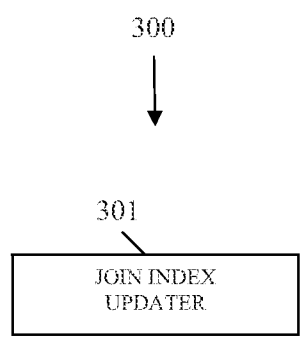
FIG. 3 is a diagram of a JI updating system, according to an example embodiment.

It is with this initial discussion of the approaches described herein that the processing associated with the FIGS. 1A and 2-3 is now discussed.

Referring now to the FIG. 1B and the processing associated with the JI updater.

At 110, the JI updater acquires a query that defines a JI. Results from executing the query represent the JI.

According to an embodiment, at 111, the JI updater obtains the query in response to a user command that directs the JI updater to update the JI (user issues an "ALTER table to CURRENT" command). By update it is meant that the JI is enhanced to provide better efficiencies as detailed above with the initial discussion.

In another case, at 112, the JI updater obtains the query in response to an instruction from an automated agent that evaluates policy and determines the joint index is to be updated (such as internally system triggered command that maintains the JI). So, the instruction to update the JI can be manually driven or driven by automated policy evaluation.

At 120, the JI updater parses the query to identify each occurrence and each context where a current date and/or a current time are used within the query. The scenarios for these situations were described in the initial discussion associated with this FIG. 1.

In an embodiment, at 121, the JI updater identifies the contexts as locations within the query having an occurrence of the current date or the current time. The contexts include instances: within a WHERE clause; within an ON clause; within both WHERE and ON clauses; within a PARTITION BY clause; within a SELECT list clause; within a GROUP BY and ORDER BY clause; and within a PRIMARY INDEX clause.

Continuing with the embodiment of 122 and at 120, the JI updater identifies when AND and/or OR conditions are included within the contexts.

At 130, the JI updater determines actions to take based on each occurrence and each context.

According to an embodiment, at 131, the JI updater uses a policy to identify the actions based on contexts within the query.

In another case, at 132, the JI updater orders the actions for a PARTITION BY clause between the DELETE and INSERT actions for other clauses.

At 140, the JI updater updates the query and the JI by using the actions to restate the query or at least affected portions of the query.

In an embodiment, at 141, the JI updater rewrites the query based on actions and then executes the query to update the JI.

In one scenario, at 150, the JI updater iterates its processing for each additional query defining an additional JI that is defined in a database.

In another case, at 160, the JI updater updates a dictionary table with the current date and the current time. These situations were discussed above as well.

FIG. 2 is a diagram of another method 200 for updating a JI, according to an example embodiment. The method 200 (hereinafter "move date operator") is implemented as instructions within a non-transitory computer-readable storage medium that execute on a plurality of processors, the processors specifically configured to execute the move date operator. Moreover, the move date operator is programmed within a non-transitory computer-readable storage medium. The move date operator may also be operational over a network; the network is wired, wireless, or a combination of wired and wireless.

The move date operator presents another and in some ways an enhanced processing perspective to that which was discussed and shown above with respect to the JI updater, represented by the method 100 of the FIG. 1A.

At 210, the move date operator parses a query that defines a JI for purposes of optimizing the processing of the JI and for purposes of updating results associated with the JI.

At 220, the move date operator records contexts for query statements within the query where a current date or current time condition is used.

In an embodiment, at 221, the move date operator notes instances of the current date and the current time usage within each context and other conditions included within each context with the usage.

Continuing with the embodiment of 221 and at 222, the move date operator identifies each context as a particular conditional SQL clause from the query.

At 230, the move date operator evaluates each context and selectively modifies some or all of the query statements to rewrite the query.

In one case, at 231 the move date operator leaves at least one query statement unchanged as a result of the evaluation and updates a dictionary table that is used with that query statement to reflect present values for the current date and the current time.

In an embodiment, at 232, the move date operator orders actions for a PARTITION BY clause between the DELETE and INSERT actions of other clauses.

According to an embodiment, at 240, the move date operator executes the query to update the JI with the results from the modified query statements.

In one scenario, at 250, the move date operator selectively deletes aspects of the JI and executes the modified query statement to update the JI.

FIG. 3 is a diagram of a JI updating system 300, according to an example embodiment. The JI updating system 300 is implemented, resides, and is programmed within a non-transitory computer-readable storage medium and executes on one or more processors specifically configured to execute the components of the JI updating system 300. Moreover, the JI updating system 300 may be operational over a network and the network is wired, wireless, or a combination of wired and wireless.

The JI updating system 300 implements, inter alia, the techniques presented and described above with reference to the FIGS. 1A, 1B, and 2.

The JI updating system 300 includes a JI updater 301.

A processor(s) is/are configured with a JI updater 301. The JI updater 301 resides within a non-transitory computer-readable medium and executes on the processor.

The JI updater 301 is configured to parse a query that defines a JI and identify contexts and conditions used with current date or current time conditions within the query. The JI updater 301 is further configured to restate the query with modified statements to update the JI based on evaluation of the contexts and the conditions.

According to an embodiment, the modified statements include ordered actions for a PARTITION BY clause between DELETE and INSERT actions of other clauses.

In another case, the JI updater 301 is further configured to selectively execute portions of the restated query to update results for the JI.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by a processor, the processor configured to execute the method, comprising:
   acquiring a query defining a join index;
   parsing the query to identify each occurrence and each context where a current date or current time condition is used;
   determining actions to take based on each occurrence and each context;
   updating the query and the join index by using the actions to restate the query; and
   devising join index maintenance mechanisms for different maintenance conditions that arise with the restated query, and devising the index maintenance mechanisms as an incremental joint index maintenance to handle: the current date or the current time present in a WHERE clause of the query, the current date or the current time present in an ON clause of the query, complex conditions within the query having the current date or the current time, the current date or the current type present in a PARTITION BY clause of the query, the current date or the current time present in a SELECT list of the query, the current date or the current time present in GROUP BY and ORDER BY clauses of the query, and the current date or the current time present in a PRIMARY INDEX clause of the query.

2. The method of claim 1 further comprising, iterating the method for each additional query defining an additional join index defined in a database.

3. The method of claim 1 further comprising, updating a dictionary table with the current date and the current time.

4. The method of claim 1, wherein acquiring further includes obtaining the query in response to a user command to update the join index.

5. The method of claim 1, wherein acquiring further includes obtaining the query in response to an instruction from an automated agent that evaluates policy and determines the join index is to be updated.

6. The method of claim 1, wherein parsing further includes identifying the contexts as a location within the query having an occurrence of the current date or the current time, the contexts including instances: within a WHERE clause, within an ON clause, within both WHERE and ON clauses, within multiple ON clauses, within a PARTITION BY clause, within a SELECT list, within a GROUP BY and ORDER BY clause; and within a PRIMARY INDEX clause.

7. The method of claim 6, wherein identifying further includes also identifying when AND and/or OR conditions are included with the contexts.

8. The method of claim 1, wherein determining further includes using a policy to identify the actions based on the contexts within the query.

9. The method of claim 1, wherein determining further include ordering the actions for a PARTITION BY clause between the DELETE and INSERT actions for other clauses.

10. The method of claim 1, wherein updating further includes rewriting the query based on the actions and then executing the query to update the join index.

11. A method implemented and programmed within a non-transitory computer-readable storage medium and processed by a processor, the processor configured to execute the method, comprising:
    parsing a query that defines a join index;
    recording contexts for query statements within the query where a current date or current time condition is used;
    evaluating each context and selectively modifying some or all of the query statements to rewrite the query; and
    devising join index maintenance mechanisms for different maintenance conditions that arise with the restated query and devising the index maintenance mechanisms as an incremental joint index maintenance to handle: the current date or the current time present in a WHERE clause of the query, the current date or the current time present in an ON clause of the query, complex conditions within the query having the current date or the current time, the current date or the current type present in a PARTITION BY clause of the query, the current date or the current time present in a SELECT list of the query, the current date or the current time present in GROUP BY and ORDER BY clauses of the query, and the current date or the current time present in a PRIMARY INDEX clause of the query.

12. The method of claim 11 further comprising, executing the query to update the join index with results from the modified query statements.

13. The method of claim 11 further comprising, selectively deleting aspects of the join index and executing the modified query statements to update the join index.

14. The method of claim 11, wherein recording further includes noting instances of the current date and the current time usage within each context and other conditions included within each context with the usage.

15. The method of claim 14, wherein noting further includes identifying each context as a particular conditional Structured Query Language (SQL) clause from the query.

16. The method of claim 11, wherein evaluating further includes leaving at least one query statement unchanged as a result of the evaluation and update a time value table that is used with that query statement to reflect present values for the current date and the current time.

17. The method of claim 11, wherein evaluating further includes ordering actions for a PARTITION BY clause between the DELETE and INSERT actions of other clauses.

18. A processor-implemented system, comprising:
a processor configured with a join index updater, the join index updater residing in a non-transitory computer-readable medium and executes on the processor;
the join index updater configured to parse a query that defines a join index and identify contexts and conditions used with current date or current time conditions within the query, the join index updater further configured to restate the query with modified statements to update the join index based on evaluation of the contexts and the conditions, and the join index updater further configured to devise joint index maintenance mechanisms for different maintenance conditions that arise with the restated query and devising the index maintenance mechanisms as an incremental joint index maintenance to handle: the current date or the current time present in a WHERE clause of the restated query, the current date or the current time present in an ON clause of the restated query, complex conditions within the restated query having the current date or the current time, the current date or the current type present in a PARTITION BY clause of the restated query, the current date or the current time present in a SELECT list of the restated query, the current date or the current time present in GROUP BY and ORDER BY clauses of the restated query, and the current date or the current time present in a PRIMARY INDEX clause of the restated query.

19. The system of claim 18, wherein the modified statements include ordered actions for a PARTITION BY clause between DELETE and INSERT actions of other clauses.

20. The system of claim 18, wherein the join index updater is further configured to selectively execute portions of the restated query to update results for the join index.

* * * * *